United States Patent Office 3,278,293
Patented Oct. 11, 1966

3,278,293
PROTECTION OF BRIQUETTED METALLIC IRON CONCENTRATES AGAINST CORROSION
Rollin P. Smith, New Canaan, Conn., assignor to R. N. Corporation, New York, N.Y., a corporation of Delaware
No Drawing. Filed Aug. 26, 1963, Ser. No. 304,629
8 Claims. (Cl. 75—1)

This invention pertains to improvements in methods and means for the low temperature reduction and recovery of metallic iron from its ores or other iron oxide-bearing materials, and has for its objective the prevention of reoxidation of the iron following reduction and also thereafter in shipment and storage. More particularly, this invention is concerned with a high pressure procedure for the production of briquettes by compression in which the component metals of which the briquettes are composed are highly resistant to oxidation.

Iron ore and the like may be directly reduced at low temperature and without fusion by means of gaseous reductants, such as hydrogen, carbon monoxide, natural gas, etc., or by means of solid reductants such as coke, coke breeze, etc., or by combinations of these two, following which the metallic iron is recovered in finely comminuted form by separating and concentrating operations involving screening, tabling, grinding and magnetic separation. In order to facilitate use and handling, it has heretofore been the practice to press the iron powder concentrate without binder into briquettes using a low compacting pressure.

It has been discovered in accordance with the present invention that reoxidation of the briquetted iron concentrate incident to exposure to the weather especially during shipping and storage, may be substantially reduced by forming the briquettes at substantially higher pressures than previously employed, for example, at least as high as 40 tons per square inch.

While the invention finds general application to iron ore reduction and recovery techniques wherein the iron values are concentrated in the manner aforesaid, it is especially adapted to the progressive and continuous ore reduction processing described in Patent 2,829,042 to O. Moklebust, wherein the ore is progressively reduced in a rotary kiln in the presence of a solid carbonaceous reducing agent, such as coke, and in an atmosphere of combustible gases and a limited supply of oxygen such that the reduction is conducted without fusion, at temperatures of about 1000–1100° C., depending on the ore being treated.

With this process the reduced ore is continuously discharged from the furnace and is passed through a water-cooled rotary drum for cooling substantially to atmospheric temperature if dry state concentration is employed, or alternatively, is partially cooled in this manner and then water quenched, if wet state concentration is utilized.

In accordance with the present invention the briquetting pressure is at least 40 tons per square inch. Pressures as high as 100 tons per square inch or even higher may be employed but the degree of stabilization attained at these higher levels rarely warrants the use of pressure above about 100 tons/in.$^2$. In preferred operations the briquettes are formed at pressures in the range of from about 45 tons per square inch to about 65 tons per square inch.

The remarkable advantages of forming briquettes at increased pressures is illustrated by experiments in which a number of iron powders prepared using the above-described procedures were formed into briquettes at varying pressures. These briquettes were stored outdoors for a total of up to 292 days and analyzed. The results are shown in Table I.

TABLE I

| Esposure to Weather, Days | Percent Metallization After Indicated Days of Exposure and at Compactiig Pressures as Indicated Below | | |
|---|---|---|---|
| | 30 tons/in.$^2$ | 40 tons/in.$^2$ | 57.5 tons/in.$^2$ |
| 0 | 93.57 | 93.96 | 94.16 |
| 13 | 91.70 | 93.87 | 93.87 |
| 21 | 90.58 | 92.79 | 92.48 |
| 28 | 93.15 | 93.01 | 92.48 |
| 35 | 91.25 | 91.73 | 92.22 |
| 42 | 89.31 | 90.38 | 92.32 |
| 52 | 88.45 | 91.45 | 92.47 |
| 60 | 87.89 | 90.20 | 91.81 |
| 292 | 82.33 | 86.94 | 89.17 |

From Table I it can be seen that the briquettes formed at 40 tons per square inch are more resistant to corrosion than those formed at 30 tons per square inch. The briquettes formed at 57.5 tons per square inch show superior resistance to corrosion to those made at 40 tons per square inch. This improvement, with increased compacting pressure, persists throughout prolonged weathering, as shown in Table I. The financial savings attributable to the increased resistance to reoxidation of the compact agglomerates of this invention will be readily apparent to those versed in the art.

In copending patent application Serial No. 110,813, filed May 17, 1961, now U.S. Patent No. 3,185,563 and assigned to the assignee of this invention there is described a procedure for increasing the stabilization of briquettes by admixing an alkaline material with the iron prior to the briquetting procedure or by dipping the formed briquettes in an alkaline medium. The process of the present invention may be used to enhance the results achieved in the prior invention.

The process described in the aforesaid application is of general applicability but is especially useful in connection with the procedures described herein. Broadly speaking it comprises incorporating up to about 5% by weight based on the amount of iron present of an alkali metal or alkaline-earth metal base or a similar salt which will hydrolyze in an aqueous medium to form a basic solution. If a sodium compound having these characteristics is utilized as little as 0.05% by weight is effective. With the wet state concentration incorporation may be effected by the addition of an anti-oxidant, e.g., an additive consisting of two parts calcium hydroxide and one part sodium carbonate by weight in a quantity such that the percent of additive is equal to 1.3% by weight of the iron present in the slurry just prior to the filtering step. Alternatively, the anti-oxidant may be added just ahead of first grinding step. If concentration is effected in the dry state, a simple dipping of the briquettes in the appropriately selected solution is adequate. The preferred additives are sodium carbonate, calcium hydroxide and trisodium phosphate.

It is possible to improve the results achieved using the process of the aforesaid application by using the process in conjunction with the high pressure briquetting techniques of the instant invention. The products obtained utilizing the combined procedures manifest an extraordinarily high degree of stability.

The briquettes of this invention find application, among other uses, as melt stock in the production of open hearth or electric furnace steel or steel alloys. In addition to high pressure, an anti-oxidant is used to provide briquettes having an extremely high order of stability. The same either volatilizes off completely during melting or is otherwise slagged off.

What is claimed is:
1. The method of protecting comminuted iron and iron concentrates against oxidation which comprises compacting the same at substantially atmospheric temperature into shaped agglomerates by the application of a pressure of at least 40 tons per square inch.

2. The method of protecting comminuted iron and iron concentrates against oxidation which comprises compacting the same at substantially atmospheric temperature into shaped agglomerates by the application of a pressure of from about 45 tons per square inch to about 100 tons per square inch.

3. The method of protecting comminuted iron and iron concentrates against oxidation which comprises incorporating therein from about 0.25 to about 5% by weight of the total, of an oxidation inhibiting agent selected from the group consisting of oxides and hydroxides of akali metal and alkaline-earth metals and salts of the same hydrolyzing in aqueous medium to produce an alkaline solution and compacting the same at substantially atmospheric temperature into shaped agglomerates at a pressure of at least 40 tons per square inch.

4. The method of protecting comminuted iron and iron concentrates against oxidation which comprises compacting said comminuted material into shaped agglomerates by the application of a pressure of at least 40 tons per square inch at substantially atmospheric temperature and applying thereto a coating of at least one oxidation inhibiting agent selected from the group consisting of alkali metal and alkaline-earth metal oxides and hydroxides and salts of the same hydrolyzing in aqueous medium to produce a basic solution.

5. As a new article of manufacture, a compacted and shaped agglomerate of iron powders and iron concentrates formed by compressing the same at substantially atmospheric temperature at a pressure of at least 40 tons per square inch.

6. As a new article of manufacture, a compacted and shaped agglomerate of iron powders and iron concentrates formed by compressing the same at substantially atmospheric temperature by the application of a pressure of from about 45 to about 100 tons per square inch.

7. As a new article of manufacture, a compacted and shaped agglomerate of iron powders and iron concentrates having incorporated throughout the body thereof from about 0.5 to about 5% by weight of the total of at least one oxidation inhibiting agent selected from the group consisting of alkali metal and alkaline-earth metal oxides and hydroxides and salts of the same hydrolyzing in an aqueous medium to produce an alkaline solution formed by the application of a pressure of at least 40 tons per square inch at substantially atmospheric temperature.

8. As a new article of manufacture, a compacted and shaped agglomerate of iron powders and iron concentrates formed by the application of a pressure of at least 40 tons per square inch at substantially atmospheric temperature and applying thereto a coating of at least one oxidation inhibiting agent selected from the group consisting of alkali metal and alkaline-earth metal oxides and hydroxides and salts of the same hydrolyzing in aqueous medium to produce an alkaline solution.

References Cited by the Examiner
UNITED STATES PATENTS

| | | | |
|---|---|---|---|
| 2,875,035 | 2/1959 | Graham et al. | 75—34 |
| 2,986,460 | 5/1961 | Babcock et al. | 75—44 |
| 3,185,563 | 5/1965 | Jones et al. | 75—1 |

BENJAMIN HENKIN, *Primary Examiner.*

DAVID L. RECK, *Examiner.*

UNITED STATES PATENT OFFICE
CERTIFICATE OF CORRECTION

Patent No. 3,278,293                                             October 11, 1966

Rollin P. Smith

It is hereby certified that error appears in the above numbered patent requiring correction and that the said Letters Patent should read as corrected below.

In the heading to the printed specification, lines 4 and 5, for "assignor to R. N. Corporation," read -- assignor to R-N Corporation, --.

Signed and sealed this 5th day of September 1967.

(SEAL)
Attest:

ERNEST W. SWIDER                                  EDWARD J. BRENNER
Attesting Officer                                             Commissioner of Patents